Figure 1:
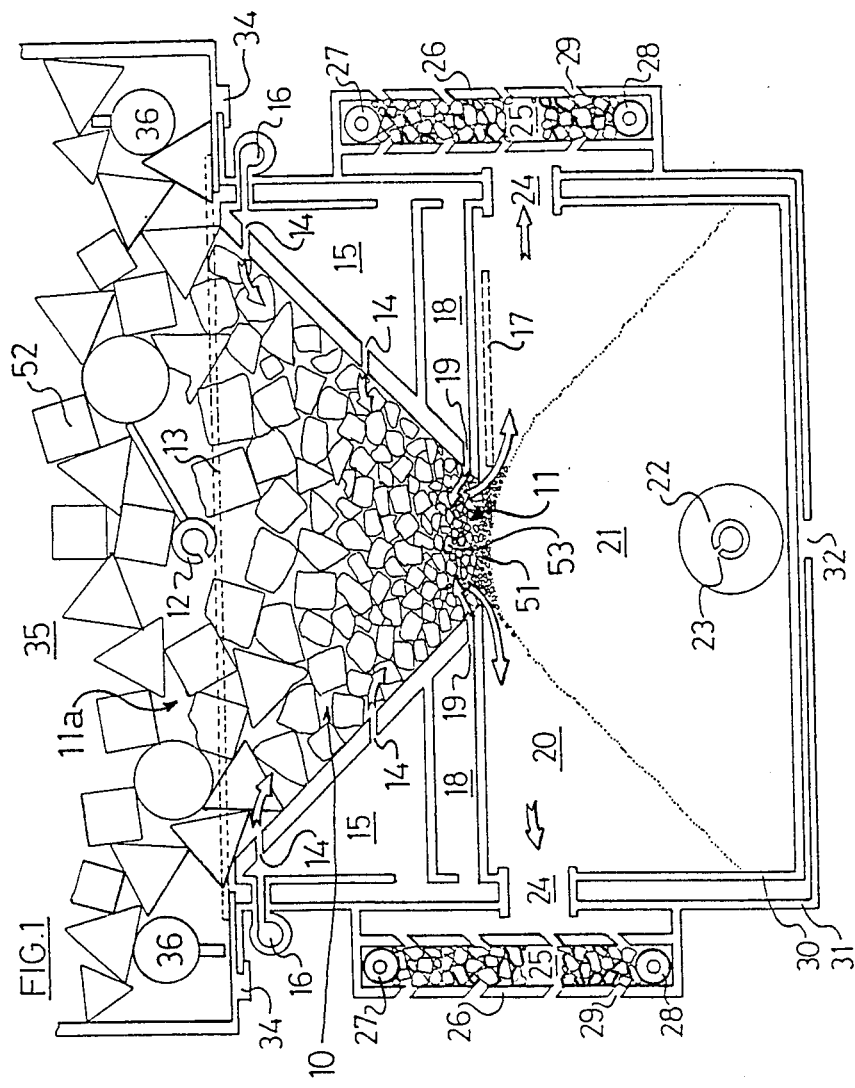

United States Patent [19]

Pike

[11] Patent Number: 4,771,711
[45] Date of Patent: Sep. 20, 1988

[54] FURNACE

[76] Inventor: Clinton B. Pike, R.D. 1, Te Kauwhata, Waikato, New Zealand

[21] Appl. No.: 81,994

[22] Filed: Aug. 5, 1987

[30] Foreign Application Priority Data

Aug. 8, 1986 [NZ] New Zealand .......... 217153

[51] Int. Cl.$^4$ .............................................. F23B 7/00
[52] U.S. Cl. ................................. 110/316; 110/165 R; 110/259; 110/315; 110/341
[58] Field of Search ............... 110/315, 316, 165 R, 110/256, 259, 229, 101 CD, 341; 126/103

[56] References Cited

U.S. PATENT DOCUMENTS

| 2,506,782 | 5/1950 | Fallon | 110/165 R |
| 3,289,618 | 12/1966 | McGinnis | 110/259 X |
| 4,274,341 | 6/1981 | Ozaltay | 110/229 |
| 4,321,877 | 3/1982 | Schmidt et al. | 110/256 X |

Primary Examiner—Edward G. Favors
Attorney, Agent, or Firm—Young & Thompson

[57] ABSTRACT

A furnace has a solid fuel hopper above a combustion chamber, an ash outlet below said combustion chamber, a combustion gas outlet at or below the level of the combustion chamber, and an auger in an ash chamber below the ash opening to regulate the size of an ash pile below the combustion chamber and hence control the escape of ash or fuel or non-combustibles through the ash opening. This enables the combustion gas outlet to be covered by hot coals within the combustion chamber so that any combustion gas from the combustion chamber or any pre-combustion zone must pass through a filter of hot coals before reaching the combustion gas outlet.

9 Claims, 4 Drawing Sheets

FURNACE

FIELD OF THE INVENTION

This invention relates to downdraft or sidedraft furnaces (whether large commercial furnaces for industrial heating or the combustion of waste material or small domestic stoves or furnaces) in which solid fuel or combustible waste material moves downwardly towards a combustion zone.

PRIOR ART

Existing downdraft or sidedraft furnaces require the presence of a lower grate to hold the burning mass of fuel in place, as they generally rely on a hopper or the like to allow fuel to fall down into a restricted combustion zone on the lower grate. Indeed most prior art patents in this field are concerned with the design of the lower grate. Examples of such furnaces include:

U.S. Pat. No. 4,278,067 - Pike
U.S. Pat. No. 4,194,487 - Cadwallader et al
U.S. Pat. No. 4,102,318 - Runquist
U.S. Pat. No. 4,441,436 - Haysahi However these grates become clogged by the build up of clinker (or incombustible material particularly where refuse is burnt within such prior art furnaces). Consequently they require frequent shut-downs for cleaning of the grates. They also suffer from the problem that smoke and unburnt gases may escape from the combustion chamber and this is undesirable.

OBJECT

It is an object of this invention to provide an improved downdraft furnace or one which will at least provide the public with a useful choice.

STATEMENT OF INVENTION

In one aspect the invention provides a furnace having solid fuel supply means above a combustion chamber, an ash outlet below said combustion chamber, combustion gas outlet(s) at or below the level of the combustion chamber, wherein the ash outlet when in use is not obstructed by a grate and there is means for regulating in use the relationship between (a) an ash pile below the combustion chamber and (b) the ash outlet, so that the ash pile below the combustion chamber can be regulated to control the passage of fuel through the combustion chamber.

The combustion gas outlet(s) is/are the zone at which the combustion gases leave the furnace and they may be vented direct to atmosphere or enter a chimney or other ducting or enter heat exchanges or other apparatus.

Preferably the furnace has primary and secondary combustion zones supplied by primary and secondary air inlets with the primary air inlets positioned above said secondary air inlets, and said primary air inlets are capable of supplying more air then said secondary air inlets so that the secondary combustion zone in use is always supplied with coals from said primary combustion zone.

Preferably said secondary air inlets are in close proximity to said combustion gas outlet(s).

In another aspect the invention provides a method of operating a furnace having solid fuel supply means above a combustion chamber, an ash outlet below said combustion chamber, combustion gas outlet(s) at or below the level of the combustion chamber, wherein the ash outlet is not obstructed by a grate and a pile of material is maintained below the ash outlet to at least partially block it so that a bed of hot coals can be maintained within the combustion chamber and combustion can be at least partially controlled by regulating the pile of material relative to the ash outlet, and wherein the combustion gas outlet(s) is/are covered by hot coals within the combustion chamber so that any combustion gas passing through the combustion chamber must pass through a filter of hot coals before reaching the combustion gas outlet(s).

DRAWINGS

The following is a description of preferred forms of the invention, given by way of example only, with reference to the accompanying drawings, in which:

FIG. 1: illustrates a first embodiment of the apparatus of this invention is a sectional view from a front elevation.

Figure 2:
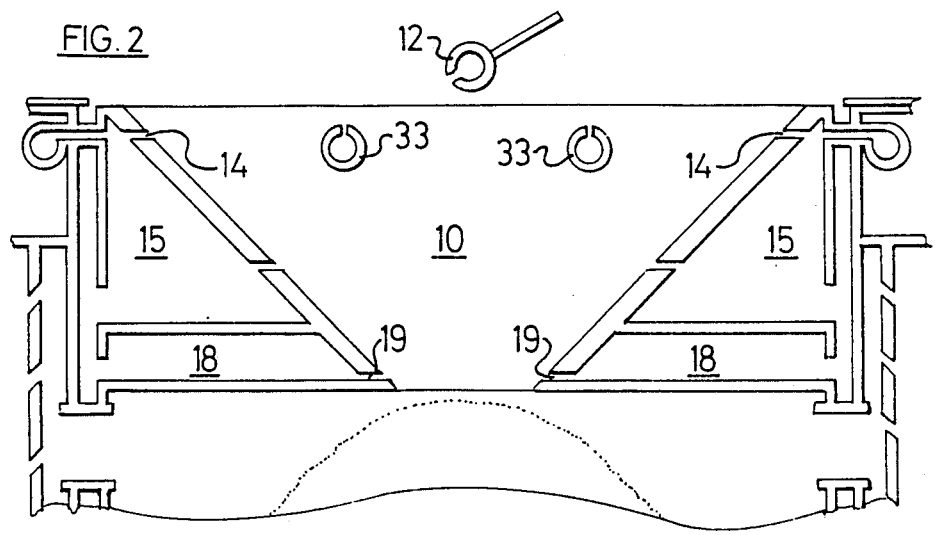

FIG. 2: illustrates a partial view of a modified form of the apparatus of FIG. 1.

Figure 3:
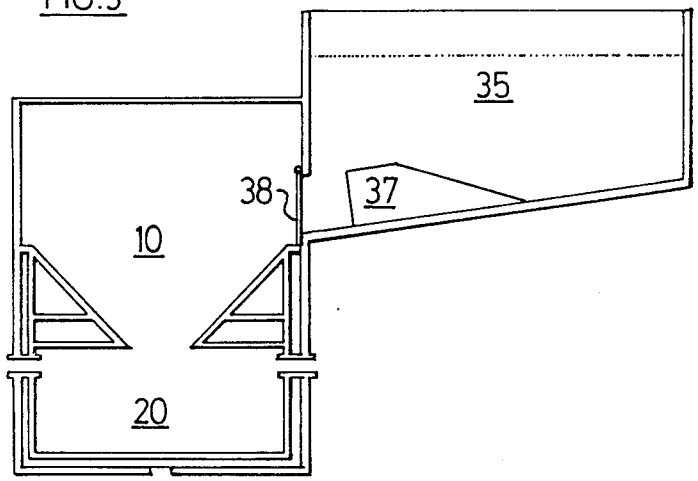

FIG. 3: illustrates a schematic view showing further modifications to the apparatus of FIG. 1.

Figure 4:
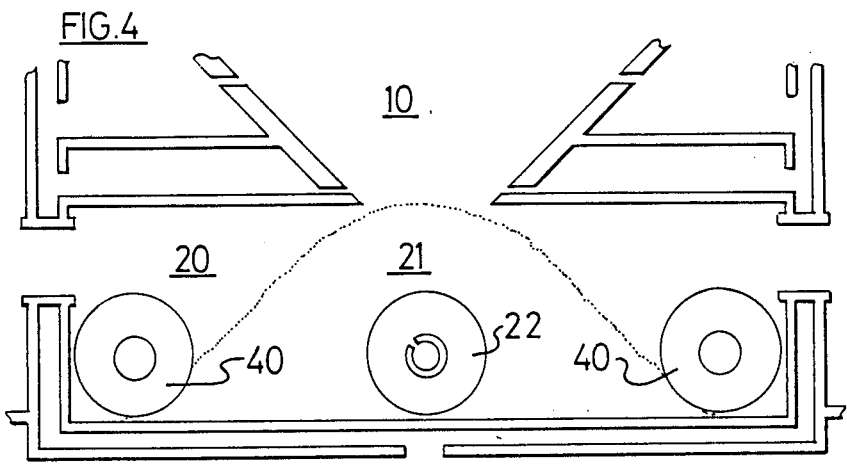

FIG. 4: illustrates a partial view showing another modified form of the apparatus of FIG. 1.

Figure 5:
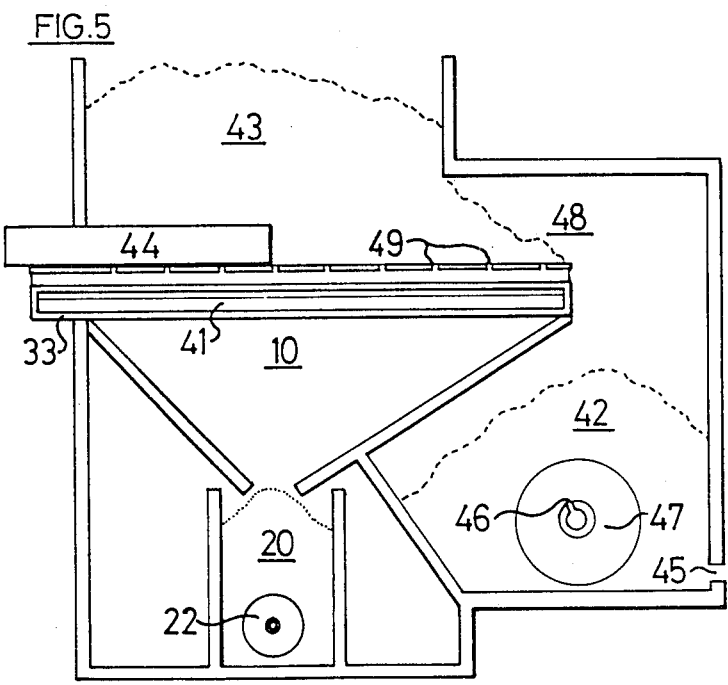

FIG. 5: illustrates a second embodiment of the invention in sectional view from a side elevation.

Figure 6:
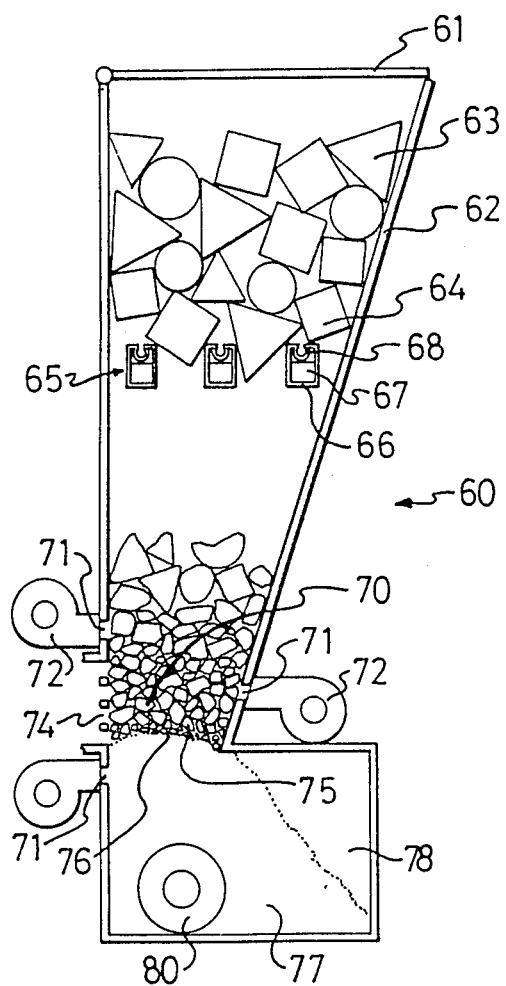

FIG. 6: illustrates a third embodiment of the invention in sectional view from a side elevation.

FIRST EMBODIMENT - FIGS. 1 to 4

A downdraft furnace in accordance with this invention has a combustion chamber 10 (which is preferably in the form of a trough and may be of any length), an ash outlet 11 which runs the length of the bottom of the combustion chamber, a combustion gas outlet (which in this case is also the ash outlet 11), a lower chamber 20, and means for regulating the relationship between (a) an ash pile 21 within chamber 20 and (b) the ash outlet 11. A solid fuel supply is provided above the chamber 10 and is preferably in the form of a hopper 35 (only part of which is shown in FIG. 1) although other means of conveying fuel to the combustion chamber can be used.

There is a main or secondary combustion zone in the lower part of chamber 10 (which in use will maintain a bed of hot coals) and there may also be a primary or pre-combustion zone in the upper part of chamber 10 (and depending upon design this may also occur in the lower part of the hopper). In addition to the chambers 10, 20, there may be a number of heat exchanging and filtering chambers, and air ducts.

The design of the furnace enables it to be of modular construction as the combustion chamber can be of any length and multiples of the furnace can be positioned side by side as required.

Referring to FIG. 1, solid fuel 52 is supplied to the upper combustion chamber 10 through the open top 11A. A rotating shaft 12 (set with pins) may be used to rake the fuel in the chamber 10, to prevent the fuel bridging across the mouth of the chamber 10 and blocking it. A slide gate 13 may be provided to close off the supply of fuel to the chamber when the furnace is not in use, or when the body of the furnace is removed, eg. for repairs.

Air is supplied to the upper part of chamber 10 through vents 14, leading from side chambers 15. This primary air may be blown in or drawn in by fans, or pulled in by the suction created by combustion and any fans used to draw the combustion gases into chamber 20. More primary air is admitted than secondary air as the primary combustion zone at the top of chamber 10 is of greater area than the secondary combustion zone towards the bottom of chamber 10.

Optionally, liquid fuel may be supplied from the rotating shaft 12, which may be hollow as shown in FIG. 1, and provided with apertures for this purpose. The liquid fuel is heated as it passes along the shaft 12 and as it falls into the chamber, by combustion in the chamber 10, and will in normal use ignite upon contact with air from the vents 14, and be fully consumed before filtering to the bottom of chamber 10. Optionally, gaseous fuel may be provided under pressure, from manifolds 16 through chambers 15 and into combustion chamber 10. Water might also be added to the air in the side chambers 15, to control the temperature of the combustion, and thereby prevent it from reaching a level where nitrous oxides are formed.

The ash outlet 11 at the bottom of the upper combustion chamber 10 is open during use of the furnace, although optionally a slide gate 17 may be provided to prevent escape of the fuel when the furnace is not in use, i.e. when the ash pile is not present.

Ashes from the combustion chamber 10 will fall through ash outlet 11, and clean combustion gases created will also pass out of the chamber 10 by this route. Smoke will however be held in the chamber 10 and recombusted. Unburnt solid matter (e.g. rocks or metal rubbish) falls onto the top of a pile of material in the lower chamber 20, which in use will be a pile of ashes 21. Although at cold start up, the material may be provided by a pile of sand or other noncombustible material. The top of this pile 21 thus provides a controlled "floor" 51 for the combustion chamber 10. If this "floor" 51 falls below the bottom of chamber 10 a combustion gas outlet can be provided around the top of the pile 21.

A bed of hot coals 53 can be maintained within the combustion chamber 10 such that combustion can be promoted by secondary air from side chambers 18, through vents 19, and the general air flow out of chamber 10 into chamber 20. Fans or blowers (not shown) may be used to blow or draw air into the combustion chamber or alternatively to withdraw combustion gases from chamber 20.

A tapered auger 22, set on a hollow shaft at the base of chamber 20, runs the length of the combustion chamber and draws ashes away from the bottom of the pile and ejects them, thereby regulating the level of the ash pile 21 such that any unburned or partially burned material at the top of the pile 21 remains in the airstream. It will be generally convenient to regulate the height of the ash pile so that its height remains constant at the level shown in FIG. 1.

Weighted or spring-loaded flaps (not shown) may be provided over the openings into chamber 18, which automatically reduce the area of the opening as draft through the furnace decreases, will change the ratio of air in the primary combustion area to air in the secondary combustion area, to optimise this ratio under different burning rates. Preferably such a flap would never completely close off the openings such that more air is always available to the primary air inlets than the secondary air inlets and that air is always available to both combustion zones under any burning conditions.

Additional air may be supplied for combustion of carbon in the ashes, from the hollow shaft of the auger, through vents 23. This air also cools the auger, and stirs through the ashes, aiding the movement process. The taper of the auger allows it to create an even distribution of ash along the length of the chamber 20, such that the top of the pile is at the same height all the way along the chamber.

As shown in FIG. 4 additional augers 40 might be provided to either side of the tapered auger 22, acting to remove ash significantly faster than the auger 22, so as to remove any ash coming into contact with them effectively at once - in this way the height of the ash pyramid is controlled, by preventing extension of the width of the pyramid base beyond a set limit. The central tapered auger 22 in such apparatus acts to remove any large or heavy lumps of non-combusting material which sink directly down through the ash pyramid rather than sliding down the sides, and also aerates the ash and ensures a complete and continuous turnover. The auger 22 in such apparatus would consequently rotate at a slower speed than that in apparatus such as that shown in FIG. 1, as it does not need to keep the ash level constant, and does not therefore need to remove as much from the bottom of the pile as is added to the top of it.

Air and combustion gases leave the chamber 20 through vents 24 which lead to heat exchangers and/or filters 25. Preferably the filters 25 are limestone filters, which remove sulphur oxides from the combustion gases by reacting with them to form solid calcium sulphate. Limestone is fed into the filter box 26 by an auger 27 at the top, and the calcium sulphate is removed by another auger 28 at the bottom. Combustion gases leave through vents 29 in the sides.

Combustion gases leaving the furnace may be expected in normal use to be relatively 'clean', having had the soot burned out by recombustion in the lower part of chamber 10, and the sulphur oxides removed by filtration.

Preferably the furnace has double walls, with a space between the inner 30 and the outer 31. Cold air enters the furnace through vents 32 in the underside and passes along the space between walls 30 and 31 before passing into the side chambers 15 and 18. While moving between the walls the air is heated, and therefore is already hot when it enters the inner chambers, thereby speeding combustion.

As shown in FIG. 2, an additional grate 33 might be provided in the upper primary combustion chamber 10 (or the lower part of the fuel hopper), this comprising a number of relatively widely spaced bars, with air channels therethrough having apertures by which air may be directly provided to fuel resting on the grate 33. These additional air inlets allow for a pre-combustion zone near the top of the combustion chamber.

This grate may hold large pieces of fuel for pre-combustion, and provide additional aeration to fuel in the upper chamber. It is preferred that this grate has a grate spacing less than or equal to the size of the ash opening so that in use solid waste may be partially combusted on the grate of the pre-combustion zone and any large incombustible material prevented from reaching the combustion zone by the presence of this grate.

Similarly ribs could be provided running down the tapered walls of the upper chamber 10, to support the fuel off the walls and allow circulation of the air around and past the fuel. As with the bars of the grate 33, such ribs might have vented air channels running through them, but these are probably not necessary, as air is already provided to these parts of the chamber 10 through the vents 14.

The entire burner may be mounted on bearings in tracks 34 such that it may slide in and out from under a fuel-holding bin or hopper 35 for ease in cleaning. The hopper may be provided with rakes mounted on rotating shafts 36 to push the fuel forward and ensure a continuous supply to the furnace. This will however only be required with some types of fuel, and in some applications, and may not be necessary with all furnaces.

The apparatus of FIG. 3 includes a sliding block 37 or other conveyor means at the base of a fuel hopper 35, which in use may slide forward to push a load of fuel through a door 38 into the combustion chamber, and then slide back to allow another load of fuel to fall down in front of it.

As long as the level of fuel is maintained above the level of the conveying means 37 at all times, substantially no air or smoke can escape by this route, and functioning of the apparatus may proceed normally. If the motive power of the block 37 is strong enough, and the doorway both strong enough and of an appropriate size, large pieces of fuel may be made of a size more suitable for combustion by crushing at the doorway. This may be required with some types of fuel, and in some applications, but will not be necessary with all furnaces.

Similarly the movable, track mounted furnace system is not necessarily suited to all applications and features of the invented apparatus could be used with an emplaced furnace or small stove or the like, within the scope of the invention.

It is generally preferable for the upper portion of chamber 10 to taper towards the base, to provide slow release of partially consumed fuel to the lower chamber. Alternatively however, the upper portion of chamber 10 could be straight walled, and the lower portion of smaller diameter to achieve a similar result. The vents and ducts need not be positioned as shown, and alternative arrangements will be apparent to those skilled in the art.

The relative sizes and shapes of the various chambers and ducts might also be altered, although at present the proportions illustrated appear preferable.

SECOND EMBODIMENT - FIG. 5

A larger furnace might be made as illustrated in FIG. 5, for the use in burning of rubbish and similar mixed and unsorted fuels, possibly with a relatively high proportion of non-combustible materials included with it. Details of the combustion chamber 10 and associated vents have been omitted but it will be appreciated that this can be of similar construction to the combustion chamber of FIG. 1.

As in the embodiment illustrated in FIG. 2, a grille composed of hollow bars 33 is provided, (one of which is shown in side view rather than end view) preferably of box or rectangular section rather than round, and being partly filled with water 41, or some other coolant, to prevent warping under heat and weight stress. (Similar water filled bars are shown in end view in FIG. 6). Pre-combustion occurs in the zone just above the bars 33 and secondary combustion occurs both in the zone at the lower part of chamber 10 and in zone 42.

Solid fuel 43 is fed into the chamber 10, where it is caught on the bars 33 and burned. A moving pusher block 44 moves across the upper surface of the bars 33 to shift the mass of fuel 43, and cause small and combusted pieces of fuel to fall between the bars 33 into the lower part of the chamber 10, while large pieces of non-combusting material, which will not fall through, are pushed to the end of the bars 33, and fall off into the chamber 42, into which the non-combusting scrap falls.

Air can enter chamber 42 either through simple vents 45 in the wall, or through vents 46 in the hollow shaft of an auger 47, the auger 47 being the conveyor means by which the non-combusting scrap is discharged from the chamber 42. Air entering chamber 42 is heated by hot scrap before entering the top of combustion chamber 10, either directly through the opening 48, or indirectly through the interior of the hollow bars 33 and vents 49 in said bars 33. Secondary combustion air can also be supplied through auger 22 to burn all combustibles before they leave chamber 20 through side outlets into the two exit chambers each side of chamber 20.

THIRD EMBODIMENT - FIG. 6

A smaller furnace 60 has a combined hopper 62 and combustion chamber 70 and has an upper lid 61 for access to the hopper. The upper hopper portion contains a reservoir of un-burnt sold fuel 63 which moves downwardly towards a pre-combustion zone 64 at an upper grate 65 provided by widely spaced box section bars 66 containing water 67 and air tubes 68 having upper air vents to aerate the pre-combustion zone. Larger pieces of fuel will be trapped on this upper grate 65 and burnt to the stage where they are small enough to fall between the bars 66 and drop onto the bed of hot coals 75 burning in the combustion chamber 70.

The combustion chamber 70 has air inlets 71 around its sides and supplied by fans 72, with some of these inlets being around the combustion gas outlet 74 which is provided by a plurality of apertures in the vertical face of the furnace. Although not shown in this way the air inlets may also be interspersed between the apertures of the combustion gas outlet. A chimney (not shown) can be added to the combustion gas outlet.

An ash outlet 76 is provided at the bottom of the combustion chamber 70 and allows ash to fall onto an ash pile 77 in chamber 78. The size of this ash pile is regulated by an auger 80 or other conveying means.

By varying the ratio of air supplied to the pre-combustion and combustion zones it is possible to regulate the rate at which the bed of hot coals is built up or consumed.

ADVANTAGES

By using a pile of removable material (such as ash) below the ash outlet it is possible to regulate the combustion and removal of material from the combustion chamber as well as avoiding the build up of clinker or non-combustible material (such as stones or metal rubbish) which occurs in prior art downdraft furnaces on the grates situated below their combustion chambers.

The design of the furnace of this invention with its combustion gas outlet at or below the level of the combustion chamber also allows for a "clean-burning" operation as any smoke or combustion gases from the cooler pre-combustion zone must pass through a filter of hot coals in the combustion chamber before reaching the combustion gas outlet. My designs, all of them in this application, have the advantage of competing the oxidation of all smoke and combustible gases while they are still inside the hot filter material because the secondary air is supplied uniformly in the exit zone of this filter of hot coals.

VARIATIONS

It is preferred that a central auger runs the length of the combustion chamber (making it a simple matter to design furnaces of different lengths) but other arrangements are possible, e.g. one or more augers or other conveying means may run at right angles to the ash outlet. Instead of a central auger any other means may be used to regulate the relationship between the ash outlet and its associated ash pile. For example the lower chamber might have a sloping base to generally bias the ash pile toward an exit at one end of the chamber. This is however a less preferable system, as rocks or slag failing to slide down this slope could cause difficulties. Vibrating apparatus acting on the sloped base could lessen the likelihood of such difficulties.

As further alternatives reciprocating pushers or scraper chain conveyors could be used, or one or more relatively high speed augers could be used with an on-/off switching system, such that when the ash pile reaches a particular height, the auger or augers are switched on, and act to reduce the height of the pile until it falls below a predetermined level, whereupon the auger or augers may be switched off. Any of a number of switching system might be used for this. One such system could use a heat sensor placed in the airflow passage out of the upper chamber into the lower chamber 20 (of FIG. 1) such that when the level of ash rises to a point where air flow is significantly blocked, and the combustion rate lowers, the switch will be activated and the ash level lowered.

Many modifications to the above may be made without departing from the scope of the present invention as broadly defined in the claims.

I claim:

1. A downdraft or sidedraft furnace having a combustion zone in a combustion chamber, an ash outlet below said combustion zone of the combustion chamber, combustion gas outlet means at or below the level of the combustion zone in the combustion chamber, solid fuel supply means to supply solid fuel to the combustion zone of the combustion chamber, air supply means to supply air to the combustion zone to burn the solid fuel in a downdraft or sidedraft mode, and wherein the ash outlet when in use is not obstructed by a grate and there is means for regulating in use the relationship between an ash pile below the combustion zone of the combustion chamber and an ash outlet; said combustion zone being at the ash pile such that in use the solid fuel supply means, air supply means, and the ash pile below the combustion zone of the combustion chamber can be regulated to maintain a bed of hot coals forming a filter through which all the combustion gases must pass downward or sideward before leaving the combustion chamber.

2. A furnace as claimed in claim 1 wherein there are primary and secondary air inlets with the primary air inlets positioned above said secondary air inlets, and said primary air inlets are capable of supplying more air than said secondary air inlets.

3. A furnace as claimed in claim 2 wherein said secondary air inlets are in close proximity to said combustion gas outlet(s).

4. A furnace as claimed in claim 3 wherein the means for regulating the ash pile includes one or more augers mounted within a chamber beneath the ash outlet.

5. A furnace as claimed in claim 4 wherein the combustion gas outlet(s) is/are provided by a plurality of apertures in at least one wall of the combustion chamber.

6. A furnace as claimed in claim 3 wherein a pre-combustion zone is provided above the combustion chamber, and said primary air inlets are provided in said pre-combustion zone by a plurality of air inlet channels therein.

7. A furnace as claimed in claim 6 wherein the air inlet channels are in the form of a grate at the bottom of the pre-combustion zone, said grate having a grate spacing less than or equal to the size of the ash opening so that in use solid waste may be partially combusted on the grate of the pre-combustion zone and any large incombustible material prevented from plugging the ash outlet by the presence of the grate.

8. A furnace as claimed in claim 7 further including means for conveying material across the surface of the grate to remove large incombustible material therefrom.

9. A method of operating a downdraft of sidedraft furnace having a combustion zone in a combustion chamber, an ash outlet below said combustion zone of the combustion chamber, combustion gas outlet means at or below the level of the combustion zone in the combustion chamber, solid fuel supply means to supply solid fuel to the combustion zone of the combustion chamber, air supply means to supply air to the combustion zone to burn the solid fuel in a downdraft or sidedraft mode, and wherein the ash outlet when in use is not obstructed by a grate; the method comprising maintaining a pile of ashes below the ash outlet to at least partially block it, maintaining a bed of hot coals within the combustion chamber supported by the ash pile, and filtering all the combustion gases by passing all the combustion gases downward or sideward through said bed of hot coals before passage of the combustion gases through said gas outlet means.

* * * * *